C. A. ANDERSON.
PIPE THREADING AND REAMING DEVICE.
APPLICATION FILED MAY 25, 1912.
1,036,409.
Patented Aug. 20, 1912.
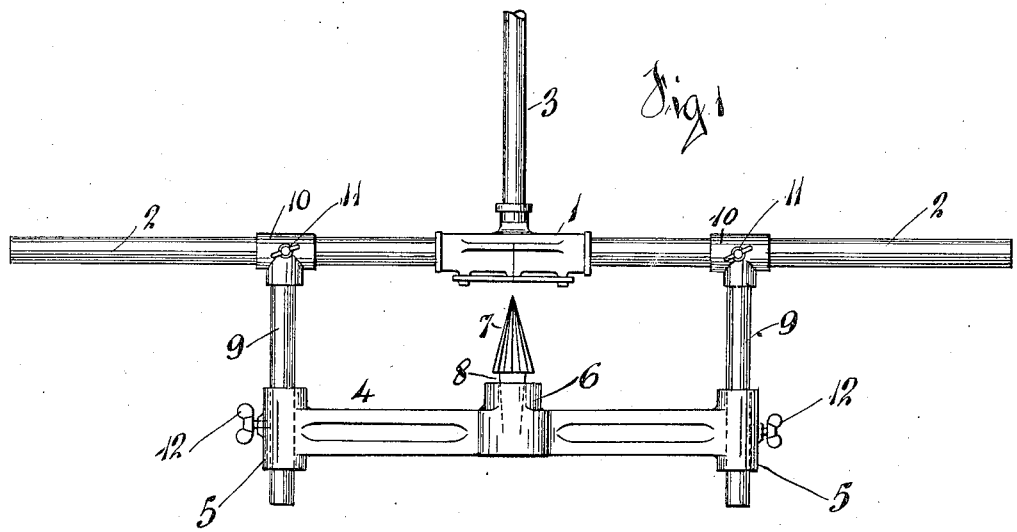
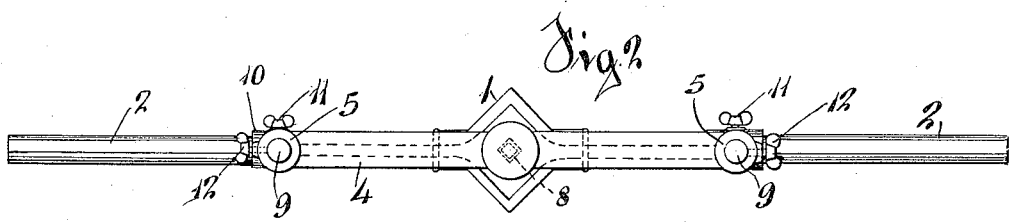
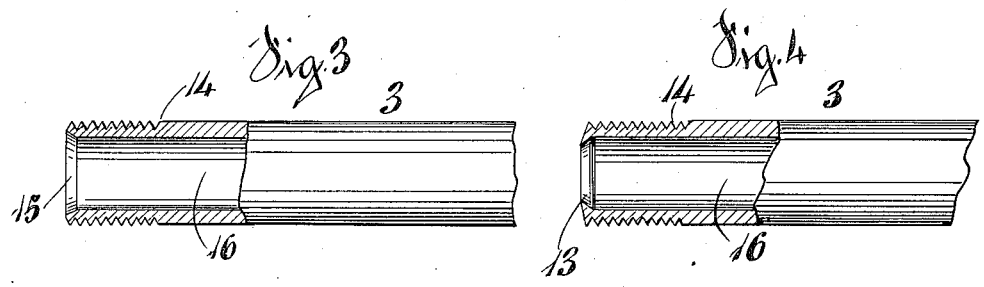
Witnesses
Inventor
Charles A. Anderson,
by John Elias Jones,
Attorney

UNITED STATES PATENT OFFICE.

CHARLES A. ANDERSON, OF NEWPORT, KENTUCKY.

PIPE THREADING AND REAMING DEVICE.

1,036,409.  Specification of Letters Patent.  Patented Aug. 20, 1912.

Application filed May 25, 1912. Serial No. 699,673.

*To all whom it may concern:*

Be it known that I, CHARLES A. ANDERSON, a citizen of the United States of America, and a resident of Newport, in the county of Campbell and State of Kentucky, have invented a certain new and useful Improvement in Pipe Threading and Reaming Devices, of which the following is a specification.

This invention relates to hand-operating devices for use in cutting screw-threads on gas, steam and similar iron and steel pipe and its object, more particularly, is to provide a reaming-attachment that is preferably mounted in a detachable and adjustable manner on the handle arms or levers of the screw-cutting die-stock whereby the clearing or reaming of the mouth of the pipe is effected in the closing turns of the screw-thread cutting operation, thus being simultaneous with a part of said screw-cutting operation.

The invention consists in certain novel features of structure that will be fully hereinafter expressed and particularly pointed out in the claim.

In the accompanying sheet of drawings, Figure 1 is a plan view of the invention herein; Fig. 2, a longitudinal elevation; Fig. 3, a fragmentary, partly sectional view of an end of pipe showing the manner in which the reamer has performed its operation in the mouth thereof; and Fig. 4, a view similar to Fig. 3 but showing the condition of the mouth of the pipe before the reaming operation therein.

1 indicates a die-stock of any suitable construction; 2, 2 the customary handle arms or levers extending from the opposite ends of the die-stock and 3 a piece or length of pipe shown in place in the die-stock for the screw-threading and the remaining operations, but omitting the vise or clamp that is required to rigidly clench or hold the pipe during said operations.

4 indicates a longitudinal bar or beam, arranged parallel to the die-stock and its oppositely-extending handle arms or levers, as best seen in Fig. 1.

5, 5 indicate hollow heads or eyes constructed at the opposite ends of the beam 4, with their bore at right-angles to the beam and 6 is a boss projecting centrally from the beam 4 toward the die-stock and in axial alinement with the axis of the thread-cutters of the die-stock.

7 indicates a reaming-tool whose shank 8 engages a suitable socket in the boss 6, free to be removed from said socket but not to turn therein. This reaming-tool is pointed axially toward the center of the opening between the screw-thread cutters of the die-stock and in true axial alinement with them and the pipe therein.

9, 9 indicate a pair of arms projecting laterally from hollow T-heads 10 that are slidingly-mounted on the handle arms or levers 2. These arms 9 are respectively engaged by the hollow heads 5 at the opposite ends of the beam 4, the latter being adapted to be drawn to and from adjacent relation with the die-stock and the handle arms or levers, whereby the reaming-tool can be readily adjusted to and from position with respect to the mouth of the pipe to be cleared and reamed. Thumb or set screws 11 are used in the T-heads 10 to set and secure the latter in place on the handle arms or levers 2 when the reaming-tool has been centralized and in adjusted position for advancing into the mouth of the pipe. Thumb-screws 12 are used in the hollow end-heads 5 or eyes of the beam 4 to set and secure said heads 5 in adjusted position on the arms 9 and the reaming-tool set in proper relation with the mouth of the pipe ready for operation toward the close of the screw-thread cutting operation.

The reamer-attachment is readily applied to the ordinary pipe threading-tool by first sliding the hollow T-heads 10 along the handle arms or levers 2 and temporarily using the thumb-screws 11 so that the arms 9 project in parallel relation forwardly from said threading-tool; then sliding the end-heads 5 of the beam 4 along the arms 9 and temporarily using the thumb-screws 12; then inserting the shank of the reaming-tool 7 in its holding-socket at the center of the beam 4, which latter has been spaced backward on the arms 9 so that said shank can duly enter its socket and the point of the reamer clear the die-stock; then releasing the thumb-screws 11 so that the reaming-tool can be properly centralized in relation with the die-stock and pipe; then again applying said thumb-screws 11; and finally releasing the thumb-screws 12 so that the beam 4 can be moved forwardly along the arms 9 to bring the point of the reaming-tool in proper relation with the thread-cutters of the die-stock and so that the reaming operation can begin simultaneous with the last or closing turns of the screw-threaders on the pipe, said thumb-screws 12 being then reset so as to firmly hold the end-heads 5 in place on the arms 9. The attachment is readily removed by simply releasing the thumb-screws 12; then withdrawing the reamer-carrier 4 from the arms 9; then releasing the thumb-screws 11; and finally withdrawing the arms 9 and their T-heads 10 from the handle arms or levers 2.

In operation, the reaming-tool 7 enters the mouth of the pipe that, in cutting it into lengths, usually has a clogging or choking inwardly-disposed bur or rough edge 13, as plainly shown in Fig. 4, and such bur is readily removed in the closing turns of the hand-operated screw-cutter while chasing the thread 14 on the end of the pipe. Such operation results in the clean, open, beveled mouth 15 seen in Fig. 3, and thus no such obstruction as the bur is present in the pipe to reduce its diameter at each joint and the consequent friction and reduction of pressure and flow in the passage-way 16.

The reaming-attachment herein shown and described is an extremely simple, cheap and convenient one and is positive in its operation of removing said bur from the mouth of the pipe at the time that the threading operation is being done.

I claim:—

A reaming-attachment for hand screw-threading tools comprising a carrier bar or beam having a central socket or eye, a reaming-tool projecting from said socket or eye, hollow end-heads on said carrier bar or beam, arms engaging said hollow end heads or eyes, hollow T-heads on said arms and thumb or set screws carried by said hollow end-heads and T-heads.

CHARLES A. ANDERSON.

Witnesses:
JOHN ELIAS JONES,
LORETTA LUCK.